2 Sheets, Sheet 1.
E. H. Graves.
Check.
No. 94,487.   Patented Sep. 7, 1869.
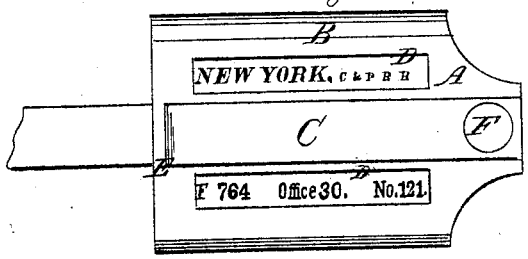
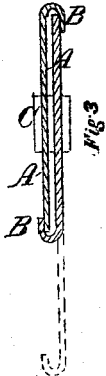 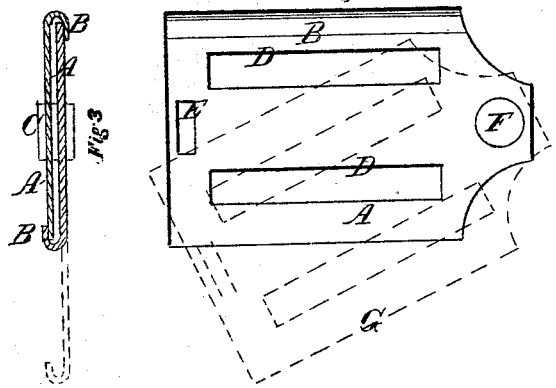
Witnesses
G. L. Chapin
E. E. Gibson
Inventor
Edward H. Graves E. H. Graves,
Check.

No. 94,487.  Patented Sep. 7, 1869.

Fig. 4.

CHICAGO & PORTAGE R. R.
This Coupon Forfeited if Detached.
BAGGAGE CHECK
Not Good unless Stamped by Baggage Master.
NEW YORK.
F 764.   Office 30.   No. 121.
Via C. & P., P. F. W. & C., P. C. and C. & A.

CHICAGO & PORTAGE R. R.
Good for one FIRST CLASS Passage to
NEW YORK,
When Stamped by the Company's Agent, and presented with Coupon attached.
NEW YORK, 764.

CAMDEN & AMBOY R. R.
One FIRST CLASS Passage
PHILADELPHIA to NEW YORK
NEW YORK, 764.

PENNSYLVANIA CENT'L R. R.
One FIRST CLASS Passage
PITTSBURG to PHILADELPHIA
NEW YORK, 764.

Pittsburg, Ft. Wayne & Chicago R. R.
One FIRST CLASS Passage
CHICAGO to PITTSBURG
NEW YORK, 764.

CHICAGO & PORTAGE R. R.
One FIRST CLASS Passage
PORTAGE to CHICAGO
NEW YORK, 764.

Good for One FIRST CLASS Baggage, when Stamped by Baggage Master.
*NEW YORK,* C. & P. R. R.
Issued by Chicago & Portage R. R.
Via C. & P., P., F. W. & C., P. C. & A.
F 764.   Office 30.   No. 121.

Good for One FIRST CLASS Baggage, when Stamped by Baggage Master.
*NEW YORK,* C. & P. R. R.
Issued by Chicago & Portage R. R.
Via C. & P., P., F. W. & C., P. C. & A. C.
F 764.   Office 30.   No. 121.

Fig. 5.

Chicago to Green Bay.
EXTRA BAGGAGE.
C. & N.-W. R'y. 761.

GREEN BAY.
Weight, _____ lbs. at ____
$ _____
Baggage Master.
C. & N.-W. R'y. 761. EXTRA Office

GREEN BAY.
Weight, _____ lbs. at ____
$ _____
Baggage Master.
C. & N.-W. R'y. 761. EXTRA Office Chicago to Green Bay.
Good for One FIRST CLASS Baggage, when Stamped by Baggage Master.
896.

GREEN BAY.
C. & N.-W. R'y. 896.   Office

GREEN BAY.
C. & N.-W. R'y. 896.   Office

G. S. Chapin
C. E. Gibson

Edward H. Graves

UNITED STATES PATENT OFFICE.

EDWARD H. GRAVES, OF CHICAGO, ILLINOIS.

FOLDING BAGGAGE-CHECK.

Specification forming part of Letters Patent No. 94,487, dated September 7, 1869.

*To all whom it may concern:*

Be it known that I, EDWARD H. GRAVES, of Chicago, in the county of Cook and State of Illinois, have invented an Improvement in Folding Checks; and I do hereby declare that the following is a full, clear, and exact description thereof, which will enable those skilled in the art to make and use the same, reference being had to the accompanying drawings and letters marked thereon, making a part of this specification, in which—

Figure 1 is a plan view of the metal case folded up with the check inside; Fig. 2, a view of the same with the check removed; Fig. 3, an end elevation of the same, looking in the direction indicated by dart $p$. Figs. 4 and 5 represent the checks before being put in the case.

The nature of the present invention consists in the peculiar construction and arrangement of a folding check, whereby baggage-checks having stations indicated on them are more securely and conveniently held in place, while at the same time they may be read without opening the check, as the whole is hereinafter fully specified.

A A represent a two-part case which opens on a joint, F, as shown by dotted lines G, Fig. 2, and which is provided with openings D D in both sides to show the letters and figures on the check. The opposite edge of each part A is so formed over as to provide grooves for those edges which are left straight to shut into, as shown at Fig. 6, leaving the parts A far enough from each other to receive the check or checks, hereinafter described.

The baggage-strap C is fastened by the same rivet, F, on which the parts A swing, and it holds said parts together by being put through holes E, made in them for this purpose.

The checks are printed on the same strip of paper as the coupon passenger-ticket, as shown at Fig. 4, Drawing 2, and the manner of using them is as follows:

The passenger who buys a ticket carries it to the baggage-master, who tears off O P on line $d$, and, after folding it, puts it in case A and secures it there by strap C, as described. The conductor takes up tickets K, L, M, and N, leaving the check I for the passenger to claim his baggage with at the end of the route.

Q R S, Fig. 5, represent checks for extra baggage, which can be folded in case A in the same manner. When setting up the type for the checks care must be taken to place the words to be seen such a distance apart as will, when the check is folded and put in case A A, bring them opposite to the holes or slots D D.

In Drawing 2, Fig. 4, the ticket and check are for a passage from Portage to New York; but of course other forms of words and figures would be necessary for a passage over other roads, nothing being claimed on the printing; but it is claimed no other check is so safe, both for a railroad company or traveling public, as this one, it being impossible, except by gross carelessness, to lose or misplace baggage.

Having thus described my invention, what I claim, and desire to secure by Letters Patent of the United States, is—

The folding check-case A A, arranged to swing open parallel with its flat sides on the pivot F, and provided with grooves for the opposite edges of the sides to shut into, with a chamber inside for receiving a check and openings for showing the letters marked on the check, and with an opening through which a strap fastened by the pivot F is put to hold the check in the case, as set forth.

EDWARD H. GRAVES.

Witnesses:
G. L. CHAPIN,
E. E. GIBSON.